A. ORTON.
AUTO BODY.
APPLICATION FILED JAN. 23, 1913.
1,094,241.
Patented Apr. 21, 1914.
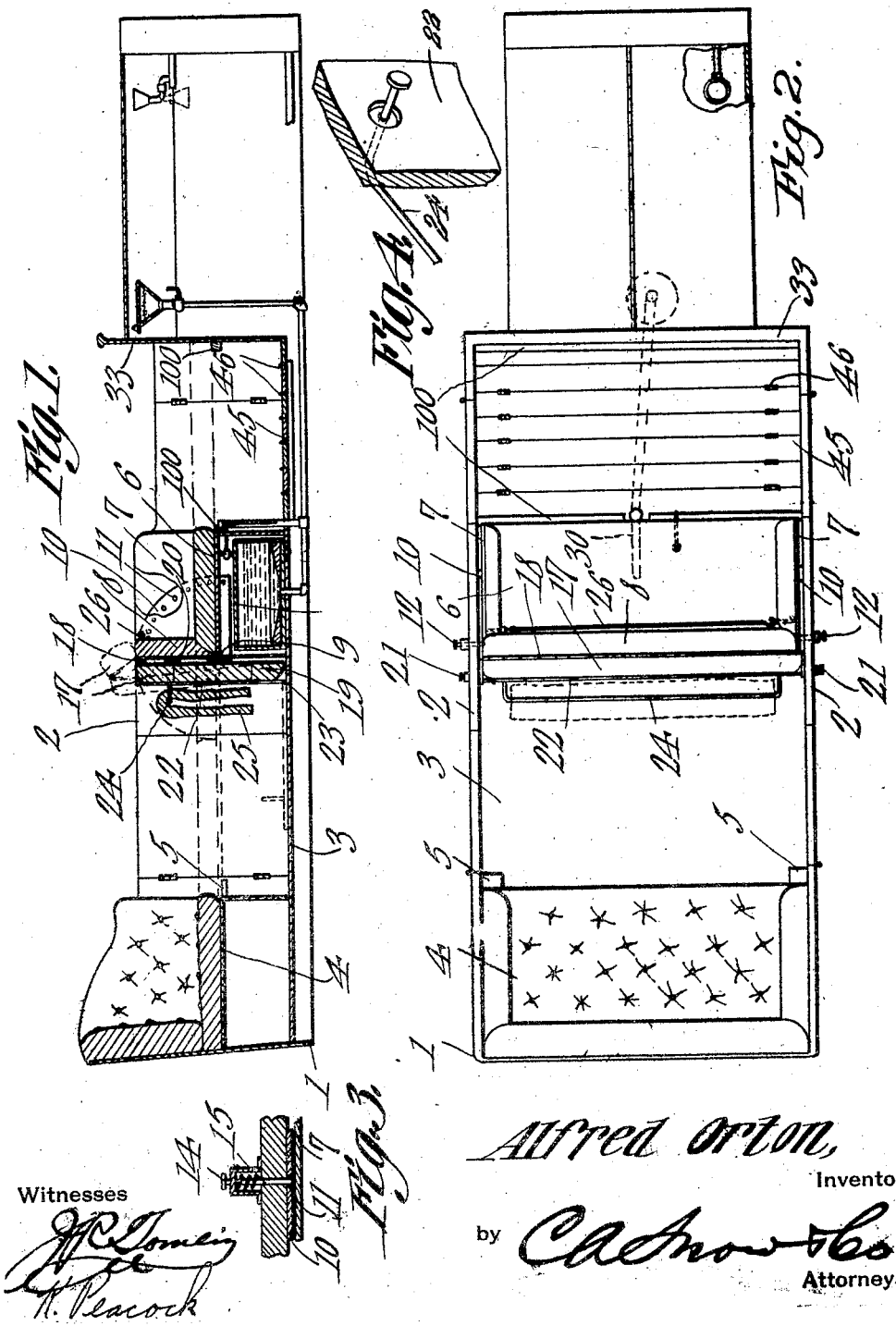
Alfred Orton,
Inventor

UNITED STATES PATENT OFFICE.

ALFRED ORTON, OF CHEYENNE, WYOMING.

AUTO-BODY.

1,094,241.   Specification of Letters Patent.   Patented Apr. 21, 1914.

Application filed January 23, 1913. Serial No. 743,863.

*To all whom it may concern:*

Be it known that I, ALFRED ORTON, a citizen of the United States, residing at Cheyenne, in the county of Laramie and State of Wyoming, have invented a new and useful Auto-Body, of which the following is a specification.

One object of the present invention is to provide an automobile which may readily be converted into an ambulance or hearse for the purpose for transporting an injured person or a corpse, the construction being such that the automobile may be employed for camping purposes and the like.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing:—Figure 1 shows the invention in side elevation; Fig. 2 is a top plan; and Fig. 3 is a fragmental horizontal section showing a portion of the latch mechanism; and Fig. 4 is a detail perspective showing the slidable mounting of the rack in the partition.

In carrying out the invention there is provided a vehicle body 1 including side walls 2 and a bottom 3.

The rear seat is denoted by the numeral 4, and upheld adjacent the rear seat are cleats 5.

The front seat is denoted by the numeral 6 and comprises fixed arms 7. A back 8 is hinged to the front seat 6 as shown at 9. Secured to the ends of the back 8 are segmental plates 10 adapted to move between the arms 7 and the side walls 2. The segmental plates 10 are provided with openings 11 adapted to be engaged by latches 12, of any desired form, so as to vary the angle of the back 8 with respect to the front seat. If desired, as shown in Fig. 3, the latches 12 may take the form of pins 14, constrained by springs 15 to engage with the openings 11 in the plates 10, the latches 12 being slidable in the side walls 2. A head rest 17 is hinged as indicated at 18, to the upper edge of the back 8, and an extension 19 is hinged as indicated at 20 to the rear or upper edge of the head rest. Latches 21 are mounted to slide in the side walls 2, the latches 21 being adapted to engage the extension 19, to hold the extension 19 in vertically adjusted positions, thereby to vary the angle of the head rest 17 with respect to the back 8. A partition 22 is hinged as indicated at 23 to the bottom 3 and may be held against the extension 19 in any desired manner. Slidable transversely in the partition 22 is a rack 24, adapted to receive robes, bedding or the like, as indicated at 25.

In practical operation, the partition 22 may be swung rearwardly and downwardly against the bottom 3, the rack 24 sliding transversely in the partition so as to permit the partition to lie flat on the bottom 3 (see dotted line showing of Fig. 1 and compare with Fig. 4). The back 8, the head rest 17, and the extension 19 may be disposed in horizontal alinement with the rear seat 4, the extension 19 and the associated parts being upheld by the cleats 5. Under such circumstances, there is formed a continuous, horizontal, supporting surface, comprising the rear seat 4, the extension 19, the head rest 17 and the back 8 of the front seat, these parts coöperating to form a bed upon which an invalid or a corpse may be placed. A strap 26 detachably connects the arms 7 of the front seat 6, to afford a back for the driver of the car, under the circumstances above pointed out. Cleats 100 may be secured to the dash board 33 and to the front seat, the cleats being adapted to uphold a cushion shown dotted in Fig. 1 the cushion forming a continuation of the horizontal supporting surface.

In front of the front seat 6 may be located an auxiliary bottom comprising a plurality of slats 45, united by hinges 46, the construction being such that the auxiliary bottom may be raised up readily, when desired.

From what has been stated hereinbefore, it is obvious that the structure herein disclosed may be converted readily into a hearse or ambulance, for the purpose of transporting a corpse or an invalid, the construction being such that the device may be used for camping purposes.

Having thus described the invention, what is claimed is:—

The combination with the body of a vehicle and front and rear seats, of a back hingedly connected with the front seat; a head rest hinged to the back; an extension hinged to the head rest, the back, the head rest and the extension being movable into horizontal alinement with the front and rear
5 seats; and means for maintaining the back, the head rest and the extension alined with the front and rear seats.

In testimony that I claim the foregoing as my own, I have hereto affixed my signature in the presence of two witnesses.

ALFRED ORTON.

Witnesses:
TILLIE JOHNSON,
JOSIE LEWIS.